July 28, 1964     W. P. SIEGMUND     3,142,235
CATADIOPTRIC OPTICAL SYSTEMS FOR CAMERAS AND THE LIKE
Filed Nov. 21, 1960                     2 Sheets-Sheet 1

INVENTOR
WALTER P. SIEGMUND
BY Louis L. Gagnon
Noble J. Williams
ATTORNEYS

July 28, 1964   W. P. SIEGMUND   3,142,235
CATADIOPTRIC OPTICAL SYSTEMS FOR CAMERAS AND THE LIKE
Filed Nov. 21, 1960   2 Sheets-Sheet 2

INVENTOR
WALTER P. SIEGMUND
BY Louis L. Gagnon
Noble J. Williams
ATTORNEYS

United States Patent Office 3,142,235
Patented July 28, 1964

3,142,235
CATADIOPTRIC OPTICAL SYSTEMS FOR
CAMERAS AND THE LIKE
Walter P. Siegmund, Woodstock, Conn., assignor to
American Optical Company, Southbridge, Mass., a
voluntary association of Massachusetts
Filed Nov. 21, 1960, Ser. No. 70,479
6 Claims. (Cl. 95—11)

This invention relates to image-forming optical systems of the catadioptric type, and more particularly relates to catadioptric systems for use with cameras or the like and provided with fiber optical means for enabling such optical systems to be operated at higher numerical apertures, or at wider angular object fields, or both, than heretofore.

While a reflecting type image-forming optical system for use with a camera or the like and employing a spherical mirror and an aspherically curved Schmidt-type corrector plate for compensating for the inherent spherical aberrations of the mirror is well known, nevertheless, the use of such a reflecting optical system has been considerably restricted in the past because of the limitations imposed thereon by having its primary image formed within the boundaries of the system. Furthermore, even though it has been possible to use, for example, an angularly disposed plane mirror centrally within such a reflecting system to relay the image-forming light rays thereof laterally to a focal plane outside the system, such an additional mirror has not been satisfactory since it can only be used in a system of relatively low numerical aperture or of very limited angular object field.

It has now been found, however, that such a catadioptric type image-forming optical system having the desirable qualities of high light-gathering ability with good imagery, good field coverage, and freedom from chromatic aberrations, astigmatism, distortion and coma, can be employed in a camera or the like and combined with a fiber optical bundle of proper design and suitable location within the system in such a manner as to act as an image relay device capable of receiving the appreciably curved primary image being formed within the system and conducting same at increased optical speed to a flat image plane located outwardly thereof.

Additionally, the invention includes optical components and means in combination with a pair of improved combined systems in such a manner as to direct separate sets of image-forming light rays from the same object field onto opposite sides of a single sensitized film and at such size and in such registry with each other that substantially double light intensity will be supplied the film during a single exposure thereof, whereby shorter exposures and thus pictures at higher rates of speed may be obtained.

The fiber optical image relay bundle may be of either a rigid or flexible construction. It is possible, when the fiber optical image relay means is of a flexible nature to arrange the exit end of at least one or possibly both fiber bundles so as to be movable toward each other. Thus, both exit ends may be pressed into intimate contact with opposite sides of the sensitized film to be exposed. Also, when the bundles are flexible, it is an easy matter to match and align the two images being formed thereby at opposite sides of the single thin film.

Furthermore, the flexibility of the fiber optical image relay means of the present invention may be such that appreciable angularity may be had when desired between the catadioptric optical system (or systems) being used to focus the image-forming light rays from an object field upon the forward end of the fiber optical relay means and the associated camera and film supporting structure adjacent the exit end or ends of said relay means.

Other objects and advantages of the invention will become apparent from the detailed description which follows when taken in conjunction with the accompanying drawing in which:

FIG. 4 is a view somewhat similar to FIG. 3 but showing a modified form of combined image-forming optical systems for photographic purposes, or the like.

Figure 1:
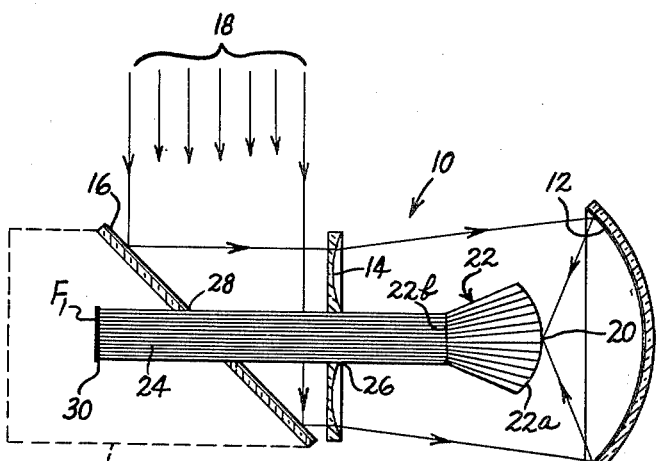
FIG. 1 is a longitudinal sectional view showing a reflecting type image-forming optical system and fiber optical image relay means associated therewith.

Referring to the drawing in detail and in particular to FIG. 1, it will be seen that a catadioptric optical system is indicated generally by the numeral 10 and comprises a concave spherically curved front surface mirror 12 arranged in optical alignment with a Schmidt-type aspherically curved corrector plate or element 14. As is well known, such a corrector plate is for providing negative spherical aberration of such a value as to compensate to a high degree for the inherent spherical abberation of the spherical mirror 12. Positioned forwardly of the corrector plate 14 is an angularly disposed plane mirror 16 and this mirror, it will be appreciated, is arranged to receive light rays such as rays 18 coming from a distant axial object field, and to reflect same in a direction at 90° thereto so as to pass through corrector plate 14.

The result of such an arrangement is that light rays from a distant object field, such as that of an aerial or astronomical camera, will be brought to a real image by the corrector plate and the mirror at an image surface 20 internally of the optical system and that this real image will have appreciable curvature of field. Even though heretofore a plane mirror has been located within such a catadioptric system for reflecting image-forming rays to a location outwardly of the system, such an arrangement cannot be used by the system of FIG. 1 without necessitating a material reduction in the numerical aperture or the degree of angular field being accommodated by the system. Thus, it will be readily apparent that reflecting optical systems of this type heretofore have been materially restricted.

In order to utilize a reflecting optical system like that of FIG. 1 at very high light-gathering efficiency and also at high angular field, it has been found that a fiber optical image transfer bundle or bundles of the type disclosed in a co-pending Hicks application Serial No. 736,172 which was filed May 19, 1958, may be employed to transfer the image to a location outwardly of the system. Thus at 22 a tapered fiber bundle is shown with its larger spherically curved end 22a within the system and at such a location as to coincide with the curved image field 20 of the reflecting system. This tapered fiber optical bundle has its smaller end 22b arranged to coincide with one end of an elongated straight-sided fiber optical bundle 24 which extends centrally within the system and passes outwardly through a central aperture 26 provided therefor in the aspheric corrector plate 14. An aperture 28 is also provided in the plane angularly arranged reflector 16 and thus the exit end of the bundle 24 may extend to a terminal location 30 outwardly of the system per se but, nevertheless, still within the confines of a camera housing indicated by dotted line 25.

Accordingly, it is an easy matter to arrange photographic film, as diagrammatically indicated at $F_1$, with its emulsion side in contact with this outer fiber bundle end for photographic purposes, or the like. Even though some of the light rays 18 travelling toward the mirror 16 will be blocked out by the fiber bundle, nevertheless, an image at high optical speed and appreciable angular field will be formed at the curved image plane 20. Also, it should be clear that since the larger end 22a of the fiber optical bundle 22 may be finished so as to have a curvature corresponding closely to the curvature of field of the real image formed by the catadioptric system and since a taper of suitable value may be provided the bundle 22, it is possible to arrange these parts so as to accept and utilize the high light-gathering ability and the relatively large angular object field afforded by the system. Also, since each fiber of the bundle 22 is tapered, the light entering each fiber will be concentrated as it passes through the fiber to the opposite end thereof. This, of course, will effect an increase in intensity of illumination at the smaller exit end of bundle 22 and thereafter for the light rays travelling through the elongated bundle 24 and to the film in contact with the exit end thereof.

Figure 2:
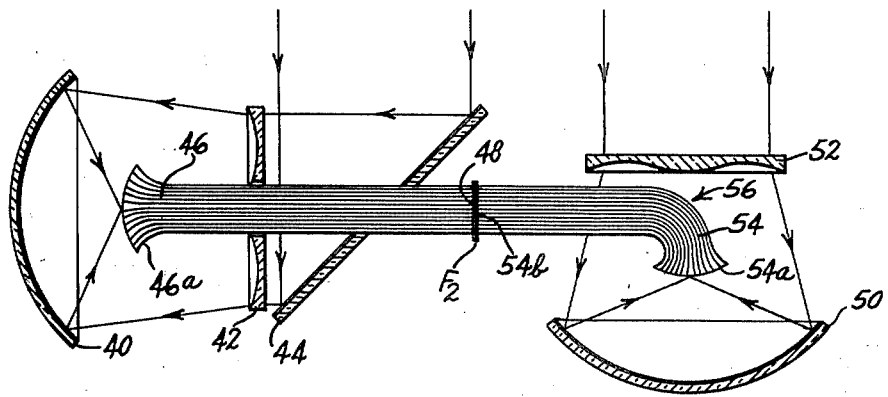
FIG. 2 is a longitudinal sectional view showing two associated reflecting image-forming optical systems, fiber optical relay means and reflecting optical components for effecting a combined photographic system.

In FIG. 2, a spherical mirror 40, a corrector plate 42, a plane mirror 44 and a fiber optical bundle 46 are shown and it will be appreciated that these parts are much like those already discussed in FIG. 1 for conducting the optical image to the emulsion on the film $F_2$. One difference does exist, however, in that the fiber optical bundle 46 is formed as a single unit instead of two separate fiber optical units. This bundle 46, instead, has an enlarged forward end formed by fibers which are tapered at their forward end 46a, as shown, and are integral with the elongated straight-sided portions extending outwardly of the system so as to terminate in a flat surface 48 adjacent the photographic film $F_2$ associated therewith. However, in FIG. 2, a second reflecting optical system has been shown and comprises a concave spherical mirror 50, an aspheric corrector plate 52, and a fiber optical bundle 54. This system, however, is of somewhat different construction in that not only do the individual fibers at their forward end 54a taper so as concentrate light being transmitted thereby but also these fibers are curved, as indicated at 56, in such a manner as to transport the image-forming light rays laterally and outwardly of the optical system without passing through the corrector plate 52. The result is that approximately the same amount of light will be blocked out as was the case in the arrangement of FIG. 1.

The outer flat end 54b of the bundle 54, however, is arranged in contacting engagement with the opposite side of the film $F_2$ in such a manner as to be in matching relation, so to speak, with corresponding fibers of the fiber optical bundle 46. In this instance, the film $F_2$ should be relatively thin in order to avoid spreading of the light passing through the film to the emulsion. Since the plane mirror 44 reflects the light rays which it receives toward the left and effects a quarter turn thereof before reaching the corrector plate 42 and the curved fiber bundle 54 for transferring the image formed by the mirror 50 is bent to the left, the end result will be that each unit area of the film emulsion will be simultaneously exposed to corresponding areas of the two images being formed by the left and right-hand parts of the combined optical system. Thus, the amount of light being provided for forming the image on the film will be substantially twice that obtainable for the film in FIG. 1.

Figure 3:
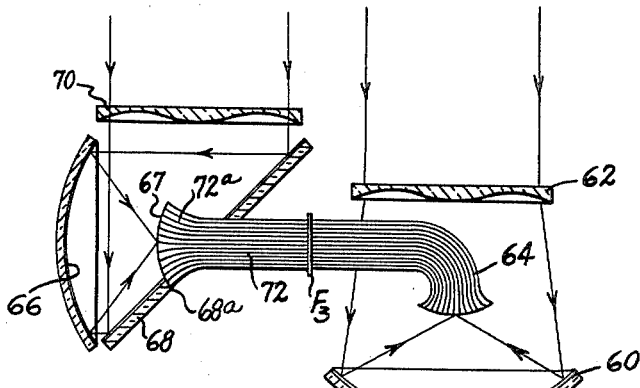
FIG. 3 is a longitudinal sectional view somewhat similar to FIG. 2 but showing a modified form of combined photographic system.

In FIG. 3, a somewhat different combined optical system is disclosed but same will accomplish substantially the same end result as that produced by the combined optical system of FIG. 2. While a concave spherical mirror 60, an aspheric corrector plate 62 and a fiber optical bundle 64, in FIG. 3, are like those shown at the right side of FIG. 2, the construction and arrangement of components for the system at the left side of FIG. 3 are different. A concave spherical mirror 66 which forms a real image at the curved focal plane 67 within the optical system receives its light rays from an angularly disposed plane mirror 68 which is aligned with an aspheric corrector element 70. Thus, light rays from a distant object field which pass through plate 70 and are laterally reflected by the mirror 68 before impinging upon the spherical mirror 66 are imaged thereby at focal plane 67. The plane mirror 68, however, is centrally apertured, as indicated at 68a, and disposed within this aperture is a fiber optical bundle 72 which has its tapered forward end 72a convexly spherically curved so as to fit closely the curvature of field of the real image being formed by the optical system. By this arrangement, a somewhat more compact combined optical system may be effected than in FIG. 2 but the results obtained by this modified form of the invention in supplying matching images to the opposite sides of the film $F_3$ are substantially the same as those obtained in FIG. 2.

Figure 4:
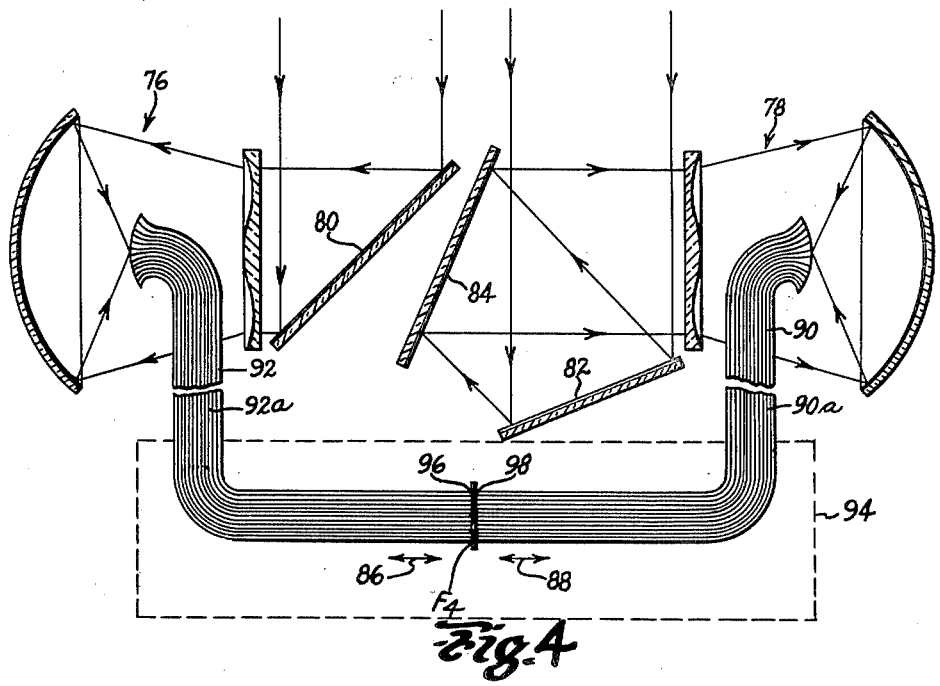

In FIG. 4, a further modified construction of combined catadioptric optical system for providing double light intensity upon a photographic film $F_4$ is shown. In this arrangement, however, even though the reflecting type image-forming systems 76 and 78 thereof are each quite similar to that disclosed at the right side of FIG. 2, nevertheless, in order to have the two images being formed thereby rightly oriented and in proper matching relation with each other but at opposite sides of the film $F_4$, there is provided, for the left side, an angularly disposed plane mirror 80 and at the right side a first angularly disposed plane mirror 82 and a second angularly disposed plane mirror 84 in properly oriented relation thereto. Thus, by the use of one more mirror in the right side of the combined system than in the left side, it is possible to so oppositely rotate or orient the two real images being supplied to opposite sides of the emulsion surface of the film $F_4$ that a proper matching of images with double light intensity will be provided therefor.

Additionally, in FIG. 4, there is indicated by the double arrows 86 and 88 that movement of the exit ends of either or both fiber bundles 90 and 92 toward or away from the film $F_4$ can be had and this would be without requiring any movement of either reflective optical system 76 or 78 relative to the other. This would be possible when the intermediate portion 90a of the fiber bundle 90 or the intermediate portion 92a of the bundle 92 is made flexible and arranged to accommodate such movement. Also, the box-like dotted lines 94 are intended to indicate the confines of a camera structure, or the like which, it should be appreciated, may be sufficiently removed from the reflecting image-forming optical systems 76 and 78 of the combined system so that angular movement of the combined image-forming system may be had without necessitating movement of any structure within the box-like camera portions of the device. Also, within this box-like portion, means (not shown) may be provided whereby a suitable liquid or semi-liquid may be applied to opposite sides of the film at exit areas 96 and 98 of the fiber bundles. This liquid or semi-liquid would be to insure complete optical contact between the film and the ends of the fibers of both bundles 90 and 92, with the result that a much higher acceptance angle for the light rays leaving the ends of the fiber and impinging upon the emulsion of the film may be had than would be possible if no such optical contact were provided.

Of course, when considering the angular field to be covered by the high-speed optical systems of the present invention, care must be exercised in the relative positioning and arrangement of the mirrors and other components of the system so that no material vignetting of the more oblique light rays from the object field of the system will occur; and, of course, this is a distinct and separate problem from that of keeping the obscuration ratio of the system as low as conveniently possible, the ratio, of course, being controlled by the size of fiber bundle and image surface being used within the system.

Having described my invention, I claim:

1. A camera or the like having relatively high-speed optical means for forming an image of an object field upon photographic film within said camera, said optical means comprising a pair of catadioptric optical systems each having a concavely curved spherical mirror and an aspheric corrector plate in optical alignment and predetermined spaced relation relative to each other, the corrector plate and spherical mirror of each of said optical systems being arranged to receive light rays from a single object field spaced therefrom and to focus said light rays as a pair of real images having appreciable curvature of field at a pair of curved image planes within said systems, respectively, and optically disposed between the mirrors and the corrector plates thereof, a pair of elongated fiber optical image-transfer bundles having their inner ends of predetermined size and of predetermined convexly curved shape and so disposed within said systems, respectively, as to be in substantial coincidence with said curved image planes of said systems, said elongated fiber optical bundles extending outwardly of said systems and having their outer end surfaces substantially flat and so disposed as to contact opposite sides of a photographic film at a predetermined film exposure position in said camera, and plane mirror means disposed in the path of the light rays of one of said systems so as to intercept said last mentioned light rays and cause a mirror image reversal thereof before reaching the concave mirror associated therewith, whereby the light rays of both systems will form a pair of real images in matching relation upon opposite sides of the photographic film at said exposure position.

2. The combination defined in claim 1 in which at least one of said elongated fiber optical bundles is of such flexibility intermediate its opposite ends as to allow movement of its flat outer end surface between its film contacting position and an out-of-the-way position to thereby allow ready insursion of photographic film between the adjacent flat end surfaces of said bundles at said exposure position.

3. A camera or the like having high-speed optical means for forming an image of an object field upon photographic film within said camera, said optical means comprising a pair of catadioptric optical systems each having a concavely curved spherical mirror and an aspheric corrector plate in optical alignment and predetermined spaced relation relative to each other, the corrector plate and spherical mirror of each of said optical systems being arranged to receive light rays from a single object field spaced therefrom and to focus said light rays as a pair of real images having appreciable curvature of field at a pair of curved image planes within said systems, respectively, and optically disposed between the mirrors and the corrector plates thereof, a pair of elongated fiber optical image-transfer bundles having their ends of predetermined size and of predetermined convexly curved shape and so disposed within said systems, respectively, as to be in substantial coincidence with said curved image planes of said systems, said elongated fiber optical bundles extending outwardly of said systems and having their outer end surfaces substantially flat and so disposed as to contact opposite sides of a photographic film at a predetermined film exposure position in said camera, and plane mirror means disposed in the path of the light rays of each of said systems so as to intercept the light rays thereof and direct same toward the concave mirrors associated therewith, whereby a mirror image reversal of said light rays of one of said systems will be effected and the light rays of both systems will form a pair of real images in matching relation upon opposite sides of the photographic film at said exposure position.

4. A camera or the like having relatively high-speed optical means for forming an image of an object field upon photographic film within said camera, said optical means comprising a pair of catadioptric optical systems each having a concavely curved spherical mirror and an aspheric corrector plate in optical alignment and predetermined spaced relation to each other, the corrector plate and spherical mirror of each of said optical systems being arranged to receive light rays from a single object field spaced therefrom and to focus said light rays as a pair of real images having appreciable curvature of field at a pair of curved image planes within said system, respectively, and optically disposed between the mirrors and the corrector plates thereof, a pair of elongated fiber optical image-transfer bundles having their inner ends of predetermined size and of predetermined convexly curved shape and so disposed with said systems, respectively, as to be in substantial coincidence with said curved image planes of said systems, said elongated fiber optical bundles extending outwardly of said systems and having their outer end surfaces substantially flat, and at least one of said flat end surfaces being movable relative to the other so as to be brought into contacting relation with said film at a predetermined film exposure position in said camera, and plane mirror means disposed in the path of the light rays of one of said systems so as to intercept said last mentioned light rays before reaching the concave mirror associated therewith, whereby, a mirror image reversal of said last mentioned light rays will be effected and the light rays of both systems will form a pair of real images in matching relation upon opposite sides of the photographic film at said exposure position.

5. A camera or the like having relatively high-speed optical means for forming an image of an object field upon photographic film within said camera, said optical means comprising a pair of catadioptric optical systems each having a concavely curved spherical mirror and an aspheric corrector plate in optical alignment and predetermined spaced relation relative to each other, the corrector plate and spherical mirror of each of said systems being arranged to receive light rays from a single object field spaced therefrom and to focus said light rays as a pair of real images having appreciable curvature of field at a pair of curved image planes within said systems, respectively, and optically disposed between the mirrors and the corrector plates thereof, and fiber optical means for transferring said real images from said curved image planes within said systems to a pair of flat exit surfaces thereon outwardly of said systems, respectively, the fiber optical means for each system comprising a tapered fiber optical portion for concentrating the light rays being received at its larger end, and an elongated substantially parallel-sided fiber optical portion aligned therewith and extending outwardly of said system, each tapered portion having its larger end of such a predetermined size and predetermined convexly curved shape and so located within its respective system as to be in substantial coincidence with the curved image plane associated therewith, the flat exit surfaces of said parallel-sided portions being so disposed relative to each other as to be closely adjacent opposite sides of photographic film at a predetermined film exposure position in said camera, and mirror means disposed in the path of the light rays of one of said systems so as to reflect said light rays and cause a mirror-image reversal thereof before reaching the concave mirror of said one system, whereby said light rays will form a pair of real images in matching relation upon opposite sides of the photographic film at said exposure position.

6. The combination defined in claim 5 in which at least one of said elongated parallel-sided portions is of such flexibility intermediate its opposite ends as to allow movement of its flat exit surface between its film contacting position and an out-of-the-way position to thereby allow ready insursion of photographic film between the adjacent flat end surfaces of said bundles at said exposure position.

References Cited in the file of this patent

UNITED STATES PATENTS

| | | |
|---|---|---|
| 1,173,083 | Banks | Feb. 22, 1916 |
| 2,354,591 | Goldsmith | July 25, 1944 |
| 2,697,182 | Sheldon | Dec. 14, 1954 |
| 2,794,380 | Rehorn | June 4, 1957 |
| 2,825,260 | O'Brien | Mar. 4, 1958 |

OTHER REFERENCES

Article: "Fiber Optics. Part III, Field Flatteners," Journal of the Optical Society of America, vol. 47, No. 7, July 1957, pages 594–598.